United States Patent
Proksa et al.

(10) Patent No.: US 9,535,167 B2
(45) Date of Patent: Jan. 3, 2017

(54) HIGH FLUX PHOTON COUNTING DETECTOR ELECTRONICS

(71) Applicant: KONINKLIJKE PHILIPS N.V., Eindhoven (NL)

(72) Inventors: Roland Proksa, Neu Wulmstorf (DE); Roger Steadman Booker, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 177 days.

(21) Appl. No.: 14/387,950

(22) PCT Filed: Mar. 8, 2013

(86) PCT No.: PCT/IB2013/051859
§ 371 (c)(1),
(2) Date: Sep. 25, 2014

(87) PCT Pub. No.: WO2013/144754
PCT Pub. Date: Oct. 3, 2013

(65) Prior Publication Data
US 2015/0063533 A1 Mar. 5, 2015

Related U.S. Application Data

(60) Provisional application No. 61/616,098, filed on Mar. 27, 2012.

(51) Int. Cl.
*G01T 1/17* (2006.01)
*G01T 1/16* (2006.01)

(52) U.S. Cl.
CPC ............. *G01T 1/171* (2013.01); *G01T 1/1606* (2013.01)

(58) Field of Classification Search
CPC .......................... A61B 6/4241; A61B 6/482
See application file for complete search history.

(56) References Cited

U.S. PATENT DOCUMENTS

| | | | |
|---|---|---|---|
| 6,525,322 B2 | 2/2003 | Wong et al. | |
| 7,208,739 B1 | 4/2007 | Yanoff et al. | |
| 7,615,753 B2 | 11/2009 | Audebert et al. | |
| 7,807,973 B2 | 10/2010 | Mott | |
| 2006/0276706 A1 | 12/2006 | Klein et al. | |
| 2008/0260094 A1* | 10/2008 | Carmi | A61B 6/032 378/19 |
| 2008/0265169 A1 | 10/2008 | Spartiotis et al. | |
| 2010/0193700 A1 | 8/2010 | Herrmann et al. | |

FOREIGN PATENT DOCUMENTS

WO 2008146230 A2 12/2008

* cited by examiner

*Primary Examiner* — Hoon Song

(57) ABSTRACT

An imaging system (100) includes a radiation source (108) that emits radiation that traverses an examination region, a paralyzable photon counting detector pixel (110) that detects photons traversing the examination region and arriving at an input photon rate and that generates a signal indicative thereof, high flux electronics (122) that produce a total time over threshold value each integration period based on the signal, a reconstruction parameter identifier (124) that estimates the input photon rate based on the total time over threshold value and identifies a reconstruction parameter based on the estimate, and a reconstructor (130) that reconstructs the signal based on the identified reconstruction parameter.

20 Claims, 3 Drawing Sheets

HIGH FLUX PHOTON COUNTING DETECTOR ELECTRONICS

CROSS-REFERENCE TO PRIOR APPLICATIONS

Figure 1:
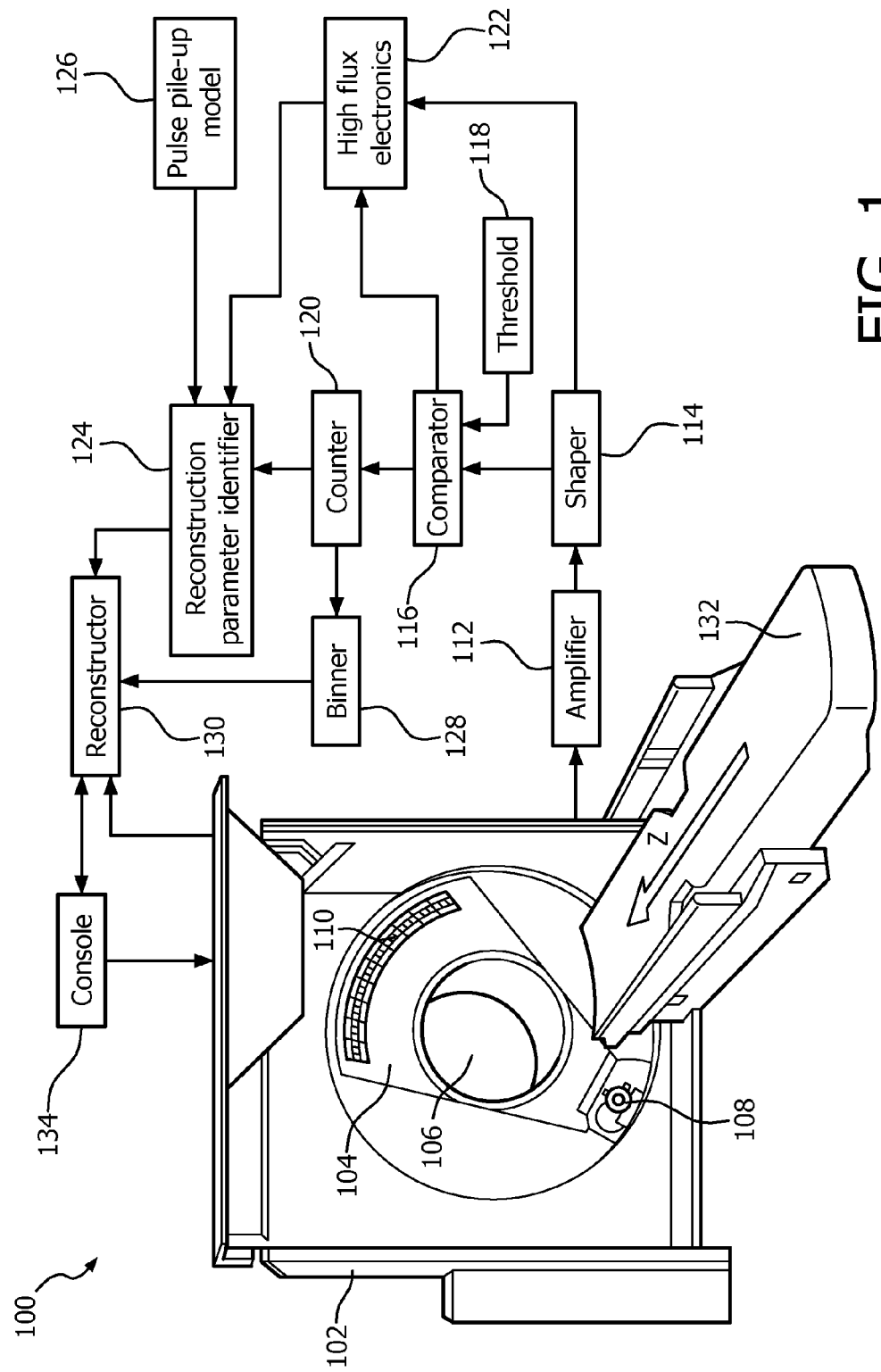

This application is the U.S. National Phase application under 35 U.S.C. §371 of International Application No. PCT/IB2013/051859, filed on Mar. 8, 2013, which claims the benefit of U.S. Provisional Patent Application No. 61/616,098, filed on Mar. 27, 2014. These applications are hereby incorporated by reference herein.

The following generally relates to imaging and more particularly to an imaging system having high flux photon counting detector electronics, and is described in connection with computed tomography (CT).

A CT scanner includes a rotating frame and a stationary frame that rotatably supports the rotating frame. An x-ray tube is supported by a rotating frame. The rotating frame and hence the x-ray tube rotate around an examination region, and the x-ray tube emits polychromatic radiation that traverses the examination region and a subject and/or object disposed therein. A radiation sensitive detector is located opposite the x-ray tube, across the examination region, and detects radiation that traverses the examination region and the subject and/or object. The radiation sensitive detector generates a signal indicative of the detected radiation. A reconstructor reconstructs the signal and generates volumetric image data indicative of the subject and/or object. An image processor can be used to process the volumetric image data and generate one or more images indicative of the subject and/or object.

The radiation sensitive detector may include a conventional integrating (scintillator/photosensor) detector or a direction conversion photon counting detector. With a direction conversion photon counting detector, each detector pixel produces an electrical signal for each photon it detects. An amplifier amplifies the signal, and a signal shaper suitably shapes the amplified signal, forming an electrical pulse having a height or peak indicative of the energy of the photon. A discriminator compares, for example, with a comparator, the amplitude of the pulse with an energy threshold that is set in accordance with a mean emission level, of the x-ray tube, of interest. A counter counts, for each threshold, the number of times the amplitude exceeds the threshold, and a binner bins the counts. The resulting binned photons can be reconstructed using a spectral and/or conventional reconstruction algorithm.

A paralyzable direction conversion photon counting detector has a non-zero dead time, which is the time it takes to resolve an individual photon detection. If the input photon rate is too high, two or more photons can be detected during the dead time of a detected photon. In this instance, the individual pulses will overlap in time, and, therefore, may not be resolvable and may be counted as a single event. This phenomenon has been referred to as pulse pile up. Paralyzable direction conversion photon-counting detectors have been operated in a paralyzable mode where if another photon arrives during the dead time of a detected photon, the dead time of the detector will be prolonged. Unfortunately, operating the detector under strong pile-up condition is difficult and the output signal will be erroneous, degrading image quality.

Aspects described herein address the above-referenced problems and others.

In one aspect, an imaging system includes a radiation source that emits radiation that traverses an examination region. A paralyzable photon counting detector pixel that detects photons traversing the examination region and arriving at an input photon rate and that generates a signal indicative thereof. High flux electronics produce a total time over threshold value each integration period based on the signal. A reconstruction parameter identifier estimates the input photon rate based on the total time over threshold value and identifies a reconstruction parameter based on the estimate. A reconstruction parameter identifier estimates the input photon rate and identifies a reconstruction parameter based on the estimate. A reconstructor reconstructs the signal based on the identified reconstruction parameter.

In another aspect, a method includes receiving, via an output of a paralyzable photon counting detector pixel, a signal indicative of photons detected during an integration interval, estimating an input photon rate of the photons based on a total time over threshold value, identifying a reconstruction parameter based on the estimate, and reconstructing the signal based on the identified reconstruction parameter.

In another aspect, a method receiving, via high flux electronics, an output of a comparator for a photon counting detector for an integration interval, determining, via the high flux electronics, a total amount of time the output of the comparator exceeds a threshold, using, via a reconstruction parameter identifier, the determined total amount of time to estimate whether the input photon rate is low or high, and determining, via the reconstruction parameter identifier, a reconstructor parameter based on the estimation.

The invention may take form in various components and arrangements of components, and in various steps and arrangements of steps. The drawings are only for purposes of illustrating the preferred embodiments and are not to be construed as limiting the invention.

FIG. 1 schematically illustrates example imaging system with a paralyzable direction conversion photon counting detector and high flux electronics for processing the output of a comparator of the detector.

Figure 2:
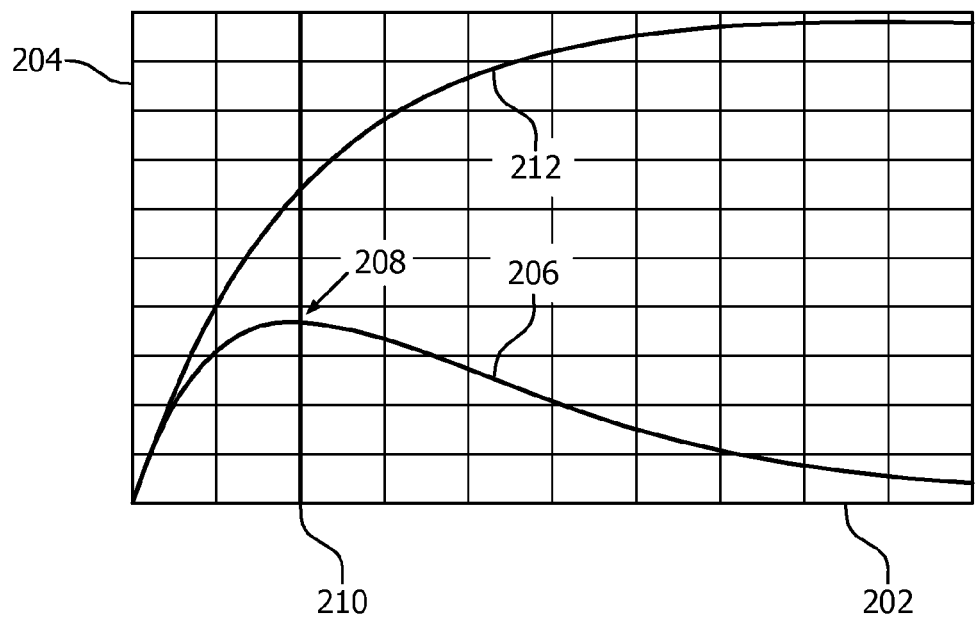

FIG. 2 graphically illustrates an output behavior of a conventional output channel of the photon counting detector and an output behavior of high flux electronics of the photon counting detector.

Figure 3:
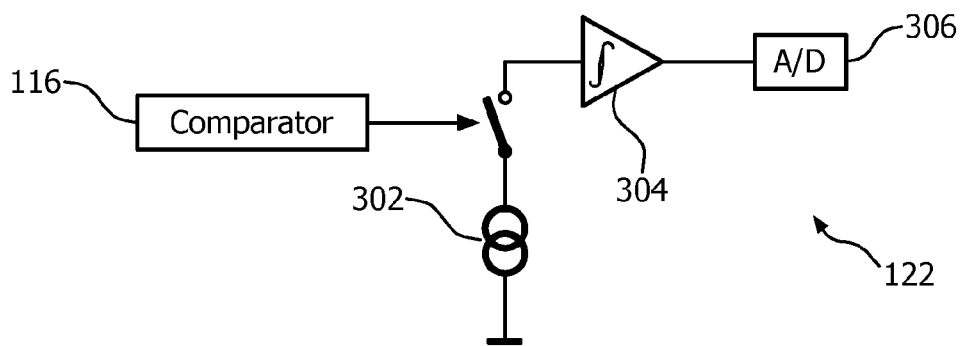

FIG. 3 schematically illustrates a non-limiting example of the high flux electronics.

Figure 4:
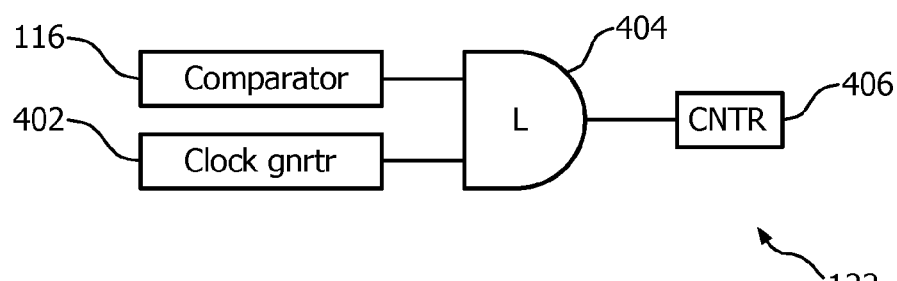

FIG. 4 schematically illustrates another non-limiting example of the high flux electronics.

Figure 5:
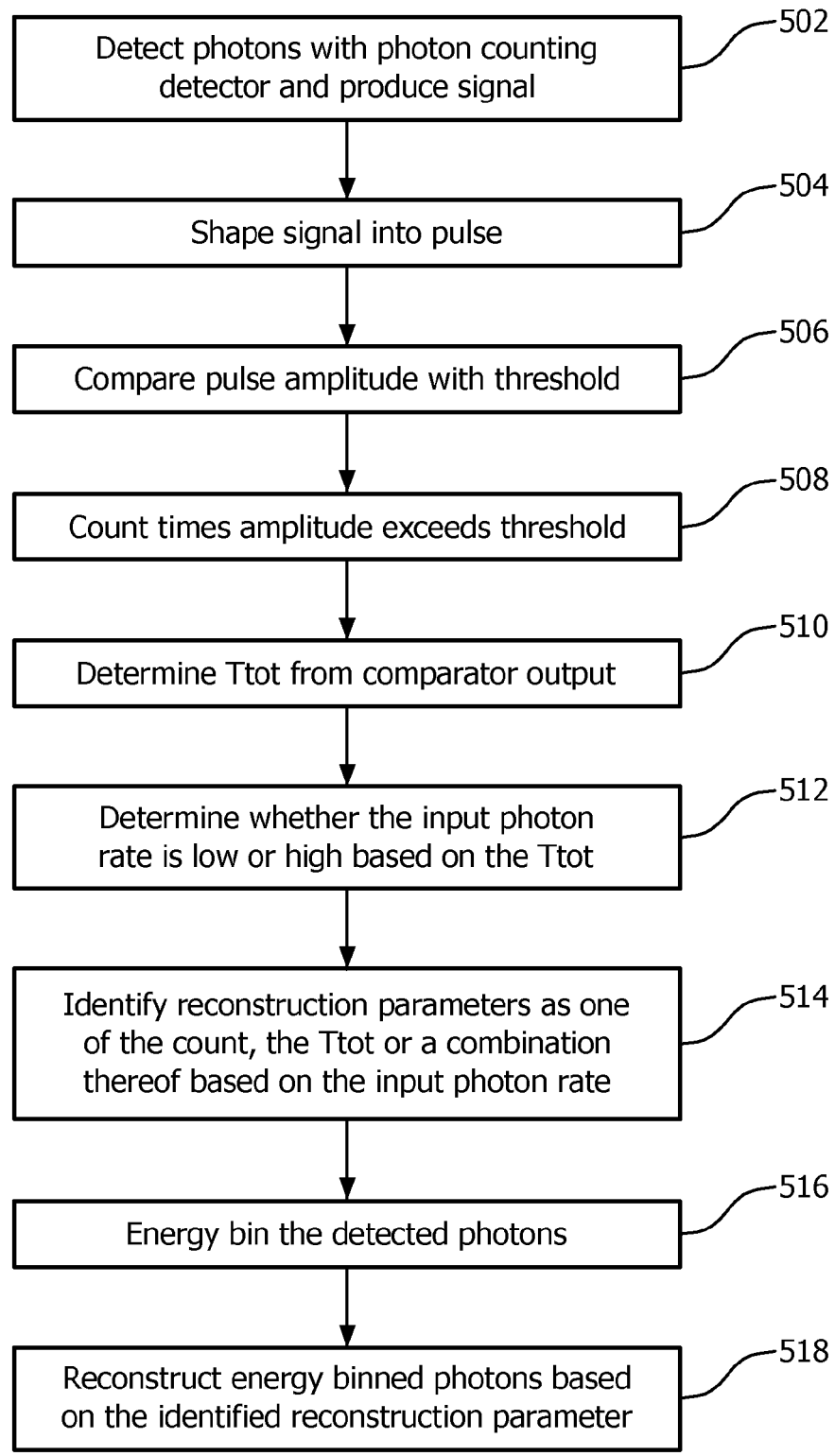

FIG. 5 illustrates an example method in accordance with the embodiments described herein.

FIG. 1 illustrates an example imaging system 100 such as a CT scanner. The imaging system 100 includes a generally stationary gantry 102 and a rotating gantry 104, which is rotatably supported by the stationary gantry 102 and rotates around an examination region 106 about a z-axis. A radiation source 108, such as an x-ray tube, is rotatably supported by the rotating gantry 104, rotates with the rotating gantry 104, and emits polychromatic radiation that traverses the examination region 106.

A radiation sensitive detector array 110 subtends an angular arc opposite the radiation source 108 across the examination region 106. The radiation sensitive detector array 110 detects radiation traversing the examination region 106 and generates a signal indicative thereof for each detected photon. In the illustrate embodiment, the radiation sensitive detector array 110 is a photon-counting detector array with a one or two dimensional array of photon-counting detector pixels that include direction conversion material such as CdTe, CZT, and/or other paralyzable direct conversion material.

An amplifier 112 amplifies the signal, and a shaper 114 processes the amplified signal and generates a pulse such as voltage or other pulse indicative of the energy of the detected photon. A comparator 116 compares the amplitude of the pulse an energy threshold 118, which correspond to an energy of interest, for example, an energy just above a noise threshold. The comparator 116 produces an output (e.g., high or low, 0 or 1, etc.) that indicates whether the amplitude exceeds the threshold.

A counter 120 and high flux electronics 122 both receive the output of the comparator 116. In another example, the counter 120 and high flux electronics 122 receive output signals from different comparators. The counter 120 increments a count value each time the signal changes from indicating the amplitude is below the threshold to indicating the amplitude exceeds the threshold each integration period. The high flux electronics 122 determines a total amount of time that the amplitude of the output of the comparator 116 is above the threshold 118 for an integration period. This value is referred to herein as total-time-over-threshold, or TTOT, and has a value between zero (0) and one (1), where zero (0) indicates the amplitude has not risen above the threshold 118 the entire integration period and one (1) means the amplitude is over the threshold the entire integration period.

Briefly turning to FIG. 2, the output behavior of the counter 120 and the high flux electronics 122 is depicted.

In FIG. 2, an x-axis 202 represents the input photon rate, and a y-axis 204 represents a level of the output signal for an integration period. A first curve 206 represents the output of the counter 120. As shown, the output of the counter 120 increases with an increasing input photon rate up to a maximum 208, which correspond to an input photon rate 210. The output of the counter 120 decreases thereafter with an increasing input photon rate.

A second curve 212 represents the output of the high flux electronics 122. As shown, the TTOT continuously increases with the increasing incoming photon rate and levels off a point where the output of the comparator 116 is or is nearly always over the threshold 118.

Returning to FIG. 1, a reconstruction parameter identifier 124 estimates whether the input photon rate is low or high based the TTOT and a pulse pile-up model 126, and identifies a reconstruction parameter as one of the count value, the TTOT or a combination thereof as based on the input photon rate and the behavior described in FIG. 2. An example pulse pile-up model 126 is described next.

Given a Poisson distribution of photo arrival and a input photon rate r, the time-to-next-photon has the likelihood density function of $f(t)=re^{-rt}$, where $\int_0^\infty f(t)dt=1$. A mean time over threshold from one photon is $\overline{T_{oT}}$. Without pulse pileup, $\overline{T_{oT}}$ represents the dead time τ. With pileup, double counting of times can be mitigated by subtracting the remaining dead time of the previous photon from the dead time τ as shown in EQUATION 1:

$$\overline{T_{oT}} = \int_0^\tau tf(t)dt + \tau \int_\tau^\infty f(t)dt$$ EQUATION 1

$$= \int_0^\tau rte^{-rt}dt + \int_\tau^\infty \tau re^{-rt}dt$$

-continued $$= \frac{1-e^{-r\tau}}{r}.$$

At the rate r, $rt_{Int}$ photons are detected in each integration interval $t_{Int}$, and a total time over threshold can be computed as shown in EQUATION 2:

$$t_{s>T}=rt_{Int}\overline{T_{oT}}.$$ EQUATION 2:

A likelihood of the output of the comparator 116 indicating the output of the shaper 114 exceeds the threshold 118 for a given integration interval can be expressed in terms of the input photon rate as shown in EQUATION 3:

$$L(s>T)=r\overline{T_{oT}}=1-e^{-r\tau},$$ EQUATION 3:

which is approximately equal to the TTOT as shown in EQUATION 4:

$$L(s>T) \approx \frac{t_{s>T}}{t_{Int}} = TTOT.$$ EQUATION 4

The reconstruction parameter identifier 124 estimates the input photon rate r based on EQUATION 3 and determines whether the input photon rate is low or high using the relationship shown in FIG. 2. If the input photon rate is low, the reconstruction parameter identifier 124 selects the count value. If the input photon rate is high, the reconstruction parameter identifier 124 selects the TTOT. For an intermediate input photon rate, a weighted combination (e.g., a mean value) of the count value and the TTOT can be computed and selected.

A binner 128 energy bins the detected photons based on the counts. A reconstructor 130 reconstructs the binned data based on the selected count value, TTOT or combination thereof, and generates volumetric image data. A subject support 132, such as a couch, supports an object or subject in the examination region 106. A general-purpose computer serves as an operator console 134 and includes a human readable output device such as a monitor and an input device such as a keyboard, mouse, etc. Software of the console 134 allows the operator to interact with the imaging system 100.

As discussed above, the high flux electronics 122 determines the TTOT, which is then used to determine whether the input photon rate is low or high. Several different approaches can be used to a TTOT. FIGS. 3 and 4 illustrate non-limiting examples of such approaches.

Initially referring to FIG. 3, the high flux electronics 122 includes a switched current source 302 that generates a fixed current i if switched on and no current if it is switched off. In the illustrated embodiment, the output of the comparator 116 switches the switched current source 302. By way of example, an output value of the comparator 116 that indicates the output of the shaper 114 is above the threshold 118 switches the switched current source 302 on, and an output value of the comparator 116 that indicates the output of the shaper 114 is below the threshold 118 switches the switched current source 302 off.

The high flux electronics 122 further includes an integrator 304 that integrates the output of the switched current source 302 and determines a total charge from this current source by integrating $I=\int_0^{t_{Int}} it_{s>T}dt$. This integral is proportional to the "on time" of the current source 302. The high flux electronics 122 further includes an analog to digital (A/D) converter 306 that digitizes the total charge (the integrated charge), for example, with a charge-to-frequency converter and a counter, or otherwise. The digital signal is a measure of the TTOT.

Turning to FIG. 4, the high flux electronics 122 includes a high frequency digital clock generator 402 and logic (L) 404. The logic 404 receives both the output of the high frequency digital clock generator 402 and the output of the comparator 116. The output of the comparator 116 gates the high frequency digital clock generator (CLOCK GNRTR) 402. The logic 404 in the illustrated example is an AND gate. A counter (CNTR) 406 counts the gated clock, and the number of counts provides an indication of the effective "on-time" of the gate signal, which provides a measure of the TTOT.

FIG. 5 illustrates an example method in accordance with the embodiments described herein.

It is to be appreciated that the ordering of the acts in the methods described herein is not limiting. As such, other orderings are contemplated herein. In addition, one or more acts may be omitted and/or one or more additional acts may be included.

At 502, the photon counting detector 110 detects photons traversing an examination region during an integration period and produces a signal indicative of an energy of the detected photons.

At 504, the shaper 114 processes the signal and produces a pulse having a height indicative of the signal.

At 506, the comparator 116 compares an amplitude of the pulse with the threshold 118 and generates an output that indicates whether the amplitude exceeds the threshold 118.

At 508, the counter 120 counts the number of times the amplitude rises above the threshold 118 each integration period.

At 510, the high flux electronics 122 processes the output and produces a total time over threshold each integration period.

At 512, a reconstruction parameter identifier 124 determines whether the input photon rate is low or high, based on the TTOT.

At 514, the reconstruction parameter identifier 124 identifies a reconstruction parameter as one of the count, the TTOT or a combination thereof based on the input photon rate.

At 516, a binner energy bins the detected photons based on the count value.

At 518, a reconstructor reconstructs the binned data based on one of the count value, the total time over threshold or a combination thereof, based the determination of whether the input photon rate is low or high.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An imaging system, comprising:
   a radiation source that emits radiation that traverses an examination region;
   a paralyzable photon counting detector that detects photons traversing the examination region and arriving at an input photon rate and that generates a signal indicative thereof;
   high flux electronics that produce a total time over threshold value each integration period based on the signal;
   a reconstruction parameter identifier that estimates the input photon rate based on the total time over threshold value and identifies a reconstruction parameter based on the estimate; and
   a reconstructor that reconstructs the signal based on the identified reconstruction parameter.

2. The imaging system of claim 1, where the reconstruction parameter identifier estimates whether the input photon rate is low or high and identifies the reconstruction parameter based thereon.

3. The imaging system of claim 1, further comprising:
   a shaper that processes the signal and produces a pulse having a height indicative of the signal;
   a comparator that compares an amplitude of the pulse with a threshold and generates an output that indicates whether the amplitude exceeds the threshold; and
   a counter that counts a number of times the amplitude rises above the threshold each integration period and produces a corresponding count value;
   wherein the high flux electronics produce the total time over threshold value based on the output of the comparator;
   wherein the reconstruction parameter identifier estimates whether the input photon rate is low or high based on the total time over threshold value and selects one of the count value, the total time over threshold value or a combination thereof.

4. The imaging system of claim 3, wherein the reconstructor reconstructs the signal data based on the selected one of the count value, the total time over threshold value or a combination thereof.

5. The imaging system of claim 4, wherein the total time over threshold value indicates a total amount of time the amplitude is above the threshold an integration period.

6. The imaging system of claim 3, the high flux electronics, comprising:
   a switched current source that generates a fixed current when switched on and no current when switched off, wherein the output of the comparator switches the switched current source; and
   an integrator that integrates the fixed current and determines a total charge each integration period,
   wherein the reconstruction parameter identifier estimates whether the input photon rate is low or high based on the total charge.

7. The imaging system of claim 6, further comprising:
   an A/D converter that converts the integrated charge to a digital signal, wherein the reconstruction parameter identifier estimates whether the input photon rate is low or high based on the digital signal.

8. The imaging system of claim 3, the high flux electronics, comprising:
   a high frequency digital clock generator that produces a high frequency digital clock; logic that gates the high frequency digital clock; and
   a counter that counts pulses of the gated clock,
   wherein the reconstruction parameter identifier estimates whether the input photon rate is low or high based on the counted pulses.

9. The imaging system of claim 8, wherein the output of the comparator controls the gating of the high frequency digital clock and gates the logic in response to the output indicating the amplitude is above the threshold.

10. The imaging system of claim 1, wherein the reconstruction parameter identifier estimates the input photon rate and identifies the reconstruction parameter based on a pulse pile up model, which models a behavior of the counter and the high flux electronics.

11. A method, comprising:
receiving, via an output of a paralyzable photon counting detector pixel, a signal indicative of photons detected during an integration interval;
estimating an input photon rate of the photons based on a total time over threshold value;
identifying a reconstruction parameter based on the estimate; and
reconstructing the signal based on the identified reconstruction parameter.

12. The method of claim 11, where the reconstruction parameter identifier estimates whether the input photon rate is low or high and identifies the reconstruction parameter based thereon.

13. The method of claim 11, further comprising:
shaping the signal to produce a pulse having a height indicative of the signal;
comparing an amplitude of the pulse with a threshold and generating an output that indicates whether the amplitude exceeds the threshold;
counting a number of times the amplitude rises above the threshold each integration period and producing a corresponding count value; and
processing the output of the comparator and producing the total time over threshold value each integration period;
wherein the input photon rate is estimated as low or high based on the total time over threshold value.

14. The method of claim 13, further comprising:
reconstructing the signal data based on one of the count value, the total time over threshold value or a combination thereof.

15. The method of claim 14, wherein the total time over threshold value indicates a total amount of time the amplitude is above the threshold an integration period.

16. The method of claim 13, further comprising:
switching a switched current source, which generates a fixed current, on and off with the output of the comparator;
integrating the generated fixed current, thereby determining a total charge for an integration interval; and
estimating whether the input photon rate is low or high based on the total charge.

17. The method of claim 16, further comprising:
converting the total charge to a digital signal; and
estimating whether the input photon rate is low or high based on the digital signal.

18. The method of claim 13, further comprising:
producing a high frequency digital clock;
gating the high frequency digital clock using with the output of the comparator;
counting pulses of the gated clock; and
estimating whether the input photon rate is low or high based on the counted pulses.

19. The method of claim 11, further comprising:
identifying the reconstruction parameter based on a pulse pile up model.

20. A method, comprising:
receiving, via high flux electronics, an output of a comparator for a photon counting detector for an integration interval;
determining, via the high flux electronics, a total amount of time the output of the comparator exceeds a threshold;
using, via a reconstruction parameter identifier, the determined total amount of time to estimate whether the input photon rate is low or high; and
determining, via the reconstruction parameter identifier, a reconstructor parameter based on the estimation.

* * * * *